(12) United States Patent  
Teague et al.

(10) Patent No.: US 8,099,353 B2  
(45) Date of Patent: Jan. 17, 2012

(54) MARKET INDICATOR PROCESS AND METHOD

(75) Inventors: William Teague, Vienna, VA (US); John Delta, Vienna, VA (US); Donald H. Bosic, Germantown, MD (US)

(73) Assignee: The NASDAQ OMX Group, Inc., Stockholm (SE)

( * ) Notice: Subject to any disclaimer, the term of this patent is extended or adjusted under 35 U.S.C. 154(b) by 0 days.

(21) Appl. No.: 12/820,169

(22) Filed: Jun. 22, 2010

(65) Prior Publication Data

US 2010/0262531 A1    Oct. 14, 2010

Related U.S. Application Data

(63) Continuation of application No. 09/941,491, filed on Aug. 29, 2001, now Pat. No. 7,742,969.

(51) Int. Cl.
*G06Q 40/00* (2006.01)
(52) U.S. Cl. ....................................................... 705/37
(58) Field of Classification Search ................ 705/36 R, 705/37
See application file for complete search history.

(56) References Cited

U.S. PATENT DOCUMENTS

| 7,167,837 | B1 * | 1/2007 | Ciampi et al. | 705/35 |
| 7,321,872 | B1 * | 1/2008 | Kaminsky et al. | 705/37 |
| 2002/0156717 | A1 * | 10/2002 | Delta et al. | 705/37 |
| 2004/0024691 | A1 * | 2/2004 | Satow et al. | 705/37 |

OTHER PUBLICATIONS

SEC's release #34-41112,file #SR-CBOE-99-05,"Self-Regulatory Organizations;Order Granting Accelerated Approval of Proposed Rule Change and Notice of Filing & Order Granting Accelerated Approval of Amendment No. 1 to Proposed Rule Change by the Chicago Board Options Exchange,Inc. Relating to Listing of Options on the Dow Jones E*Commerce Index."*

* cited by examiner

*Primary Examiner* — Susanna M Meinecke Diaz
(74) *Attorney, Agent, or Firm* — Nixon & Vanderhye P.C.

(57) ABSTRACT

A market indicator process, residing on a server, predicts an opening index price of a security index including at least two discrete securities. A trade monitoring process monitors at least a portion of the trading of the discrete securities that occur outside of a regular trading session. A closing price variation calculation process, responsive to the trade monitoring process, calculates the predicated opening index price of the security index for the beginning of the next regular trading session with respect to a closing index price of the security index at the end of the previous regular trading session. The index prices are indicative of the cumulative value of the discrete securities.

26 Claims, 4 Drawing Sheets

MARKET INDICATOR PROCESS AND METHOD

RELATED APPLICATIONS

This application is a continuation (and claims the benefit of priority under 35 USC 120) of U.S. application Ser. No. 09/941,491, filed Aug. 29, 2001 (now U.S. Pat. No. 7,742, 969). The disclosure of the prior applications are considered part of (and is incorporated by reference in) the disclosure of this application.

This application herein incorporates by reference U.S. Pat. No. 6,061,663, entitled "Index Rebalancing", and issued on May 9, 2000.

This application herein incorporates by reference U.S. patent application Ser. No. 09/841,661, entitled "Extended Hours Trade Filtering", and filed on Apr. 24, 2001.

BACKGROUND

This invention relates to market index indicators.

Stock indexes (e.g., the Dow Jones Industrial Average, the Nasdaq 100, the Standard & Poor's 500, etc.) are grouping of various securities, which are traded in a stock market or on an exchange. These indexes are valued in a way that takes into account the value of each individual security included in the index, such that a variation in the value of an individual security affects the value of the stock index.

An example of a stock market is The Nasdaq Stock Market®, whereas an example of an exchange is the New York Stock Exchange®.

As a traditional, floor-traded, exchange, the New York Stock Market requires interaction on a trading floor between human traders to accomplish stock trades. This trading most typically occurs during regular trading hours (which is commonly referred to as the regular trading session). However, electronic trading has been proposed for exchanges such as the New York Stock Exchange. Stock markets which trade electronically, such as the Nasdaq Stock Market, additionally allow for automated "extended-hours" trading between traders via computers before and after normal trading hours.

As electronic or other types of trading allow for "extended-hours" trading, if a security included in a stock index is traded during these "extended-hours", the value of that security will typically change as a result of this trading activity. Accordingly, the value of any stock index including the traded security will also change. Unfortunately, the value of this stock index which includes the traded security generally is not recalculated until the beginning of the regular trading session (i.e., non-extended-hours) for that stock market.

SUMMARY

According to an aspect of this invention, a market indicator process, residing on a server, predicts an opening index price of a security index including at least two discrete securities. A trade monitoring process monitors at least a portion of the trading of the discrete securities that occur outside of a regular trading session. A closing price variation calculation process, responsive to the trade monitoring process, calculates the predicated opening index price of the security index for the beginning of the next regular trading session with respect to a closing index price of the security index at the end of the previous regular trading session. The index prices are indicative of the cumulative value of the discrete securities.

One or more of the following features may also be included. The market indicator process further includes an index definition process for defining the security index including at least two discrete securities. The trade monitoring process is configured to monitor at least a trade price of each monitored trade of the discrete securities.

The security index is a market capitalization weighted index. The closing price variation calculation process includes a closing index market capitalization process for calculating a closing index market capitalization value for the security index. The closing index market capitalization value is the market capitalization value of the security index at the end of the previous regular trading session.

The closing price variation calculation process includes a current index market capitalization process for calculating a current index market capitalization value for the security index. The current index market capitalization value is the current market capitalization value of the security index. The current index market capitalization process includes a discrete security market capitalization process for calculating a discrete market capitalization value for each discrete security included in the security index. Each discrete market capitalization value is the product of the total number of outstanding shares of the discrete security and the trade price of the discrete security. The trade price represents the last trade value that the discrete security traded for. The current index market capitalization process includes an index market capitalization process, responsive to the discrete security market capitalization process, for summing each discrete market capitalization value to determine the current index market capitalization value for the security index. The closing price variation calculation process includes a market capitalization comparison process for comparing the closing index market capitalization value and the current index market capitalization value to calculate the predicated opening index price of the security index.

The security index is a stock weighted index. The closing price variation calculation process includes a closing index stock weighting process for calculating a closing index stock weighted value for the security index. The closing index stock weighted value is the stock weighted value of the security index at the end of the previous regular trading session.

The closing price variation calculation process includes a current index stock weighting process for calculating a current index stock weighted value for the security index. The current index stock weighted value is the current stock weighted value of the security index. The current index stock weighting process includes a discrete security trade value summing process for summing the trade price of each discrete security included in the security index to generate the current index stock weighted value. The trade price represents the last trade value that the discrete security traded for. The closing price variation calculation process includes a stock weighting comparison process for comparing the closing index stock weighted value and the current index stock weighted value to calculate the predicated opening index price of the security index.

The trade monitoring process includes a trade filtering process for filtering bad trades that occur outside of a regular trading session.

According to a further aspect of this invention, a market indicator method for predicting an opening index price of a security index including at least two discrete securities includes monitoring at least a portion of the trading of the discrete securities that occur outside of a regular trading session. The market indicator method calculates the predicated opening index price of the security index for the beginning of the next regular trading session with respect to a closing index price of the security index at the end of the previous regular trading session. The index prices are indicative of the cumulative value of the discrete securities.

One or more of the following features may also be included. The market indicator method further includes defining the security index including at least two discrete securities. The monitoring at least a portion of the trading includes monitoring at least a trade price of each monitored trade of the discrete securities.

The security index is a market capitalization weighted index. Calculating the predicated opening index price includes calculating a closing index market capitalization value for the security index. The closing index market capitalization value is the market capitalization value of the security index at the end of the previous regular trading session.

Calculating the predicated opening index price includes calculating a current index market capitalization value for the security index. The current index market capitalization value is the current market capitalization value of the security index. Calculating a current index market capitalization value includes calculating a discrete market capitalization value for each discrete security included in the security index. Each discrete market capitalization value is the product of the total number of outstanding shares of that discrete security and the trade price of that discrete security. The trade price represents the last trade value that that discrete security traded for. Calculating a current index market capitalization value includes summing each discrete market capitalization value to determine the current index market capitalization value for the security index. Calculating the predicated opening index price includes comparing the closing index market capitalization value and the current index market capitalization value to calculate the predicated opening index price of the security index.

The security index is a stock weighted index. Calculating the predicated opening index price includes calculating a closing index stock weighted value for the security index. The closing index stock weighted value is the stock weighted value of the security index at the end of the previous regular trading session.

Calculating the predicated opening index price includes calculating a current index stock weighted value for the security index. The current index stock weighted value is the current stock weighted value of the security index. Calculating a current index stock weighted value includes summing the trade price of each discrete security included in the security index to generate the current index stock weighted value. The trade price represents the last trade value that that discrete security traded for. Calculating the predicated opening index price includes comparing the closing index stock weighted value and the current index stock weighted value to calculate the predicated opening index price of the security index. Monitoring at least a portion of the trading includes filtering bad trades that occur outside of a regular trading session.

According to a further aspect of the invention, a computer program product residing on a computer readable medium having a plurality of instructions stored thereon which, when executed by the processor, cause that processor to monitor at least a portion of the trading of the discrete securities that occur outside of a regular trading session. Computer program product calculates the predicated opening index price of the security index for the beginning of the next regular trading session with respect to a closing index price of the security index at the end of the previous regular trading session. The index prices are indicative of the cumulative value of the discrete securities.

One or more advantages may be provided from one or more aspects of the invention. Trades that occur outside of a regular trading session (i.e., those that occur during extended-hours trading) can be scrutinized to determine their impact on a stock index. By monitoring these extended-hours trades, the opening value of a stock index can be predicted. By tailoring the size of a stock index, the scope of the index can be fine-tuned to reflect a specific sector of the stock market. Accordingly, by monitoring the extended-hours trading of the specific securities included in the stock index, the trend of that specific sector of the stock market can be monitored during these extended-hours.

The details of one or more embodiments of the invention are set forth in the accompa-nying drawings and the description below. Other features, objects, and advantages of the invention will be apparent from the description and drawings, and from the claims.

DETAILED DESCRIPTION

Figure 1:
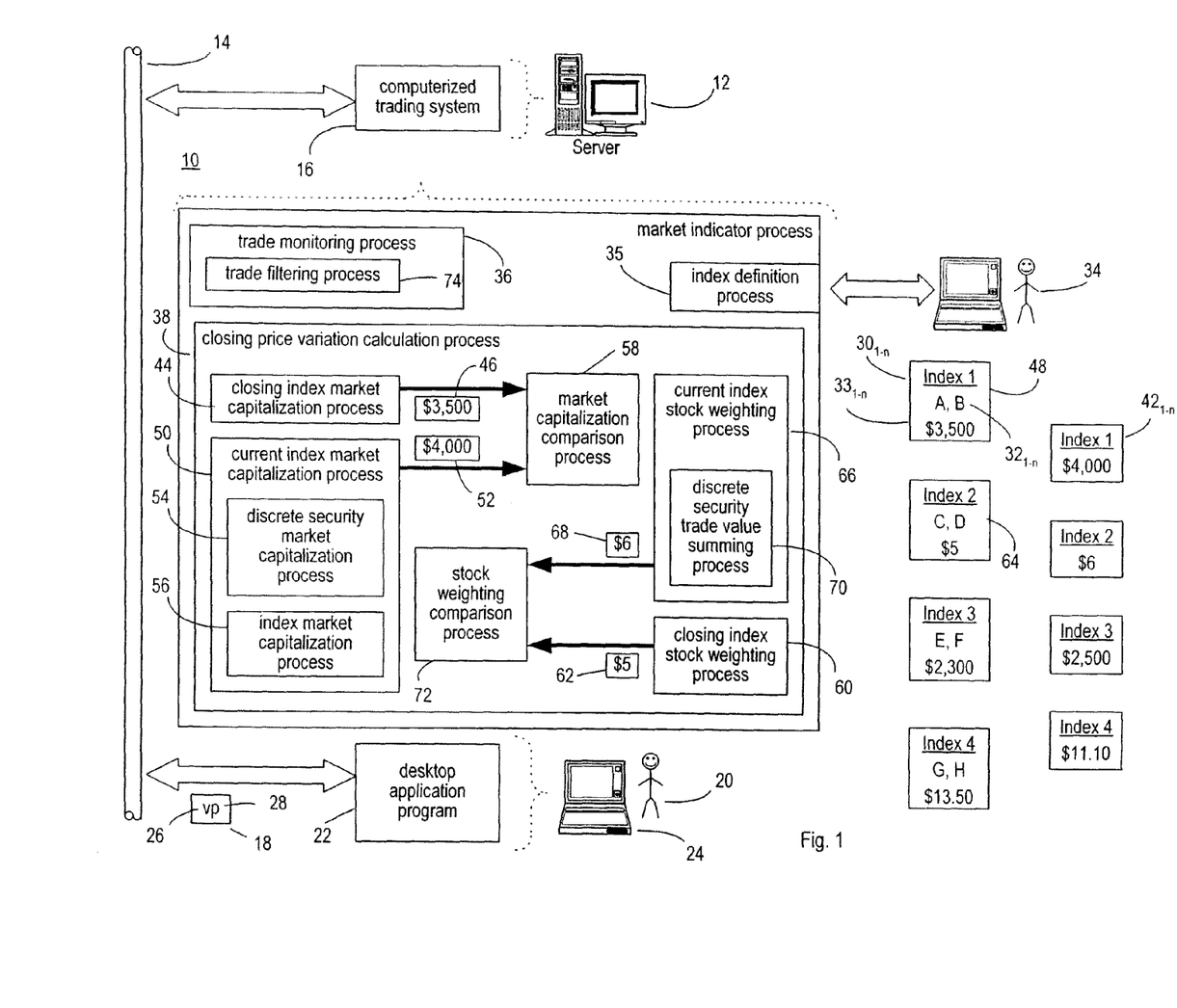
FIG. 1 is a diagrammatic view of a market indicator process.

Referring to FIG. 1, there is shown a market indicator process 10. Market indicator process 10 resides on server 12 which is connected to a distributed computing network 14 (e.g., the Internet, an intranet, a local area network, or some other form of network). Computerized trading system 16, which trades securities electronically and also resides on server 12, processes trades 18 entered by user 20. User 20 typically accesses computerized trading system 16 via a desktop application 22 (e.g., Microsoft Internet Explorer™, Netscape Navigator™, a specialized desktop interface, etc.) residing on a desktop computer 24. When trades are processed by computerized trading system 16, each trade 18 includes a trade volume "V" 26 and trade price "P" 28.

Computerized trading system 16 allows for the definition of various security indexes $30_{1-n}$, each of which includes various discrete securities $32_{1-n}$. Examples of these discrete securities $32_{1-n}$ are stocks, bonds, options, futures, etc. Examples of these security indexes $30_{1-n}$ are the Dow Jones Industrial Average, the Standard & Poor's 500, the Nasdaq 100, etc. These indexes each have a closing price $33_{1-n}$ associated with them which takes into account the value of each individual security included in the index, such that a variation in the value of an individual security affects the value of the stock index. These closing prices $33_{1-n}$ are indicative of some representation of the cumulative value of the discrete securities included in a particular security index $30_{1-n}$. While only four security indexes $30_{1-n}$ are shown, this is for illustrative purposes only. The actual number of indexes specified within computerized trading system 16, which is configurable by administrator 34, can be varied to accommodate specific market conditions or needs. Market indicator process 10 includes an index definition process 35 for allowing administrator 34 to define these security indexes $32_{1-n}$. Additionally, while each index $30_{1-n}$ is shown to include only two discrete securities $32_{1-n}$ this is also for illustrative purposes only, as the number of discrete securities included in the index can be varied to adjust the scope of that index.

As computerized trading system 16 trades electronically (as opposed to trading on a trading floor), computerized trading system 16 can conduct trading for extended periods of time. An example of an electronically-traded trading system is the Nasdaq Stock Market™ and an example of a floor-traded trading system is the New York Stock Exchange™. As traditional, floor-traded, trading systems require interaction on a trading floor between human traders to accomplish stock trades, this trading most typically occurs during the regular trading hours or session (i.e., 9:30 a.m. to 4:00 p.m. ET). However, electronically traded stock markets additionally allow for automated "extended-hours" trading between traders via computers before and after normal trading hours. For example, the Nasdaq Stock Market™ allows trading before normal business hours (between 8:00 a.m. and 9:30 a.m. ET) and after normal business hours (between 4:00 p.m. and 6:30 p.m. ET). Please realize that any trading system that includes a computerized component for automated trading can trade electronically. Accordingly, even a floor-traded system can trade electronically if there is a computerized component, which facilitates the floor trades. Even for floor trading there is discussion concerning trading after hours. Therefore, the trading systems encompassed herein could include systems such as the New York Stock Exchange.

During the course of the regular trading session, the discrete securities $32_{1-n}$ included in an index $30_{1-n}$ are traded and the value of these individual securities change with each trade. These variations in the value of the discrete securities included in a specific stock index have a direct impact on the value of that stock index. Often, the value of the index is periodically calculated to reflect changes in prices of the component securities. This value of the stock index will continue to vary until the end of the regular trading session. The value of the stock index at the end of the trading session is known as the closing price for that stock index.

Accordingly, each stock index $30_{1-n}$ has a closing price $33_{1-n}$ associated with it. This value, as stated above, is the value of the index at the end of the regular trading session. This closing price will remain constant until the beginning of the next regular trading session, which may be overnight or over a weekend. At the beginning of the next trading session, the value of the individual securities $32_{1-n}$ included in the security index $30_{1-n}$ will determine the value of the stock index $30_{1-n}$. This is known as the opening price for that stock index.

Market indicator process 10 includes a trade monitoring process 36 that monitors the trades (and related trade values) of the specific securities $32_{1-n}$ included in a stock index $30_{1-n}$ which occur outside of that stock market's regular trading session. As discussed above, this regular trading session is a defined time period, which for the Nasdaq Stock Market is typically 9:30 a.m. to 4:00 p.m. ET. Monitoring these trades enables market indicator process 10 to predict the opening price of the security index $30_{1-n}$ at the beginning of the next regular trading session.

Administrator 34 can configure trade monitoring process 36 to monitor as many or as few trades of the securities $32_{1-n}$ included in a stock index $30_{1-n}$ as the specific application calls for. For example, administrator 34 can configure trade monitoring process 36 so that it monitors: every trade; every other trade; only trades involving two or more shares; all but the first and last trade; etc. Naturally, the level of accuracy of the predicted opening price is proportional to the number (or percentage) of trades monitored.

A closing price variation calculation process 38 is responsive to trade monitoring process 36 monitoring trades of securities $32_{1-n}$ that occur outside of the regular trading session. Closing price variation calculation process 38 calculates the predicted opening index price $42_{1-n}$ of each of the monitored security indexes $30_{1-n}$ for the beginning of the next regular trading session. This calculation of the predicted opening index price $42_{1-n}$ of a security index $30_{1-n}$ is based on the closing index price $33_{1-n}$ of that specific security index $30_{1-n}$ and the extended-hours trading activity of the securities $32_{1-n}$ included in that security index $30_{1-n}$.

The manner in which closing price variation calculation process 38 calculates the predicted opening index price $42_{1-n}$ of each of the security indexes $30_{1-n}$ varies depending on whether the index is a market capitalization weighted index or a stock weighted index. Accordingly, the two different types of stock indexes will be discussed separately.

For a Market Capitalization Weighted Index:

Closing price variation calculation process 38 includes a closing index market capitalization process 44 for calculating a closing index market capitalization value 46 for each security index $30_{1-n}$ which is a market capitalization weighted index. This closing index market capitalization value 46 of a security index is the total market capitalization value of all the shares of each security $32_{1-n}$ included in that index at the end of the regular trading session. As stated above, at the end of a regular trading session, each security index $30_{1-n}$ has a closing price $33_{1-n}$ associated with it. For a market capitalization weighted index, the closing index market capitalization value 46 for a particular security index is its closing price $33_{1-n}$. For example, turning our attention to a specific index, security index 48 includes securities "A" and "B". If security "A" is shares in a company "A. Corp" which has one thousand outstanding shares which last traded (at the end of the last regular trading session) for $2.00 per share, the market capitalization for security "A" is $2,000. If security "B" is shares in a company "B. Corp" which has five hundred outstanding shares which last traded (at the end of the last regular trading session) for $3.00 per share, the market capitalization for security "B" is $1,500. Accordingly, the closing index market capitalization value 46 of security index 48 is $3,500. The closing index market capitalization value of that index 48 at the end of the last regular trading session is a value that will remain constant until the next trading session begins.

Closing price variation calculation process 38 includes a current index market capitalization process 50 for calculating a current index market capitalization value 52 for the security indexes $30_{1-n}$ In this particular example, there are four security indexes and they have closing prices $33_{1-n}$ of $3,500, $5, $2,300, and $13.50 respectively. These closing prices 33 remain constant until the beginning of the next regular trading session. However, in the event that one or more of the securities that make up a particular security index are sold during extended-hours trading, these trades will most-likely alter the opening price for that stock index. The value that those securities were traded for will be used by market indicator process 10 to calculate a predicted opening index price $42_{1-n}$ for that security.

When a trade which will effect the opening price for a particular stock index is monitored by trade monitoring process 36, current index market capitalization process 50 will calculate a current index market capitalization value 52 for that particular stock index. This current index market capitalization value 52 is the market capitalization value of that particular stock index at the time immediately following the trade of one of the securities included within the particular stock index. Accordingly, each time an "extended-hours" trade is processed for a security included in a particular security index, that trade will effect the opening price of that security index.

Current index market capitalization process 50 includes a discrete security market capitalization process 54 for calculating a discrete market capitalization value for each discrete security included in the particular security index. Continuing with the above-stated example, if one hundred shares of "B. Corp", which traded during the regular trading session for $3.00 per share, were traded for $4.00 per share during extended-hours trading, the most current value for one share of "B. Corp" is $4.00. Therefore, the market capitalization for security "B" is $2,000 (i.e. 500 shares worth $4.00 each). Assuming that security "B" is the only security in security index 48 that traded during the extended-hours trading, this is the only security that has to have its market capitalization recalculated. However, administrator 34 can decided whether to recalculate all securities included in that security index or only those securities that have been traded during the extend-hours period (i.e., only those securities that will have an impact on the current index market capitalization value 52 for that particular stock index). This will enable administrator 34 to balance server loading and accuracy.

Current index market capitalization process 50 includes an index market capitalization process 56 for summing each of the discrete market capitalization values calculated by discrete security market capitalization process 54 to determine the current index market capitalization value 52 for the security index impacted by extended-hours trading. Accordingly, index market capitalization process 56 will sum the $2,000 market capitalization value of "security "B" (i.e., the security who's market capitalization value has changed due to extended-hours trading) and the $2,000 market capitalization value of security "A" (i.e., the security who's market capitalization value has not changed since the end of the last trading session). This summing process by index market capitalization process 56 will result in the current index market capitalization value 52 being equal to $4,000.

Current index market capitalization value 52 and closing index market capitalization value 46 are provided to a market capitalization comparison process 58. Market capitalization comparison process 58 compares these values 46 and 52 so that the predicted opening index price $42_{1-n}$ can be calculated for the respective security index. This comparison can be handled in one of several ways. For example, in this particular example, the current index market capitalization value 52 is equivalent to the predicted opening index price for that particular security index, as current index market capitalization value 52 takes into account the current value of each security within security index 48. Alternatively, a ratio (i.e., a multiplier) can be determined which will allow for calculation of the predicted opening price for that particular index. In this particular example, as the current index market capitalization value 52 is $4,000 and the closing index market capitalization value 46 is $3,500, the ratio would be 4,000/3,500 or 1.143. Therefore, this is indicative that the opening index price $42_{1-n}$ for that particular security index will be approximately 14.3% greater than its closing price.

Administrator 34 may scale the value of a security index so that it only reflects an administrator-defined portion of the market capitalization value for that security index. For example, continuing on the above-started example, if security "A" had a market capitalization value of $40,000,000,000 and security "B" had a market capitalization value of $50,000,000,000, it would be awkward to have this security index close at a value of $90,000,000,000. Therefore, administrator 34 may chose to define the value of the security index to be 0.0000001% of its actual value. Accordingly, the value of this index would be $90, which is a much more manageable number. This scaling can occur in the current index market capitalization process 50 and closing index market capitalization process 44, so that values 46 and 52 are pre-scaled before being provided to the market capitalization comparison process 58. Alternatively, this scaling can occur in the market capitalization comparison process 58 itself. Additionally, administrator 34 may chose to bolster or limit the influence that certain securities have on a security index. For example, continuing with the above-stated example, security "A" has a market capitalization value of $2,000 and security "B" has a market capitalization value of $2,000. If a third security, namely security "Q" was added which had a market capitalization value of $50,000,000,000, it is easy to see that even a drastic movement in the market capitalization values of either or both securities "A" and "B" would have essentially no impact on the value of security index 48. This is due to the fact that security "Q" accounts for 99.999992% of the total market capitalization for that security index. Therefore, administrator 34 may choose to limit the impact that a specific security can have on the value of a security index. This is often accomplished by limiting the amount that a discrete security's market capitalization value can be in relation to the security index's market capitalization value. Naturally, this limit can be expressed as either a percentage of the index's market capitalization value or a finite dollar amount. This method of index rebalancing is the subject of U.S. Pat. No. 6,061,663, entitled "Index. Rebalancing", which issued on May 9, 2000, and is herein considered incorporated by reference.

For a Stock Weighted Index:

Closing price variation calculation process 38 includes a closing index stock weighting process 60 for calculating a closing index stock weighted value 62 for each security index $30_{1-n}$ which is a stock weighted index. This closing index stock weighted value 62 of a security index is the sum of the value of one share of each security $32_{1-n}$ included in that index at the end of the regular trading session. As stated above, at the end of a regular trading session, each security index $30_{1-n}$ has a closing price $33_{1-n}$ associated with it. For a stock weighted index, the closing index stock weighted value 62 for a particular security index is its closing price $33_{1-n}$. For example, turning our attention to a specific index, security index 64 includes securities "C" and "D". If security "C" is shares in a company "C. Corp" which last traded (at the end of the last regular trading session) for $2.00 per share, and security "D" is shares in a company "D. Corp" which last traded (at the end of the last regular trading session) for $3.00 per share, the closing index stock weighted value 62 of security index 64 is $5. Again, the value of that index 64 at the end of the last regular trading session will remain constant until the next trading session begins.

Closing price variation calculation process 38 includes a current index stock weighting process 66 for calculating a current index stock weighted value 68 for the security indexes $30_{1-n}$. In this particular example, there are four security indexes and they have closing prices $33_{1-n}$ of $3,500, $5, $2,300, and $13.50 respectively. These closing prices $33_{1-n}$ remain constant until the beginning of the next regular trading session. However, in the event that one or more of the securities which make up a particular security index are sold during extended-hours trading, these trades will most-likely alter the opening price for that stock index and, therefore, the value that these securities were traded for will be used by market indicator process 10 to calculate a predicted opening index price $42_{1-n}$ for that security.

When a trade which will effect the opening price for a particular stock index is monitored by trade monitoring process 36, current index stock weighting process 66 will calculate a current index stock weighted value 68 for that particular stock index. This current index stock weighted value 68 is the current stock weighted value of that particular stock index at the time immediately following the trade of one of the securities included within the particular stock index. Accordingly, each time an "extended-hours" trade is processed for a security included in a particular security index, that trade will effect the opening price of that security index.

Current index stock weighting process 66 includes a discrete security trade value summing process 70 for summing the trade price of one share of each discrete security included in the security index to generate the current index stock weighted value 68. This current index stock weighted value 68 of the security index is the summation of the current trade price of each security $32_{1-n}$ included in that index. These current trade prices represent the last trade value that the discrete security traded for.

Continuing with the above-stated example, if one thousand shares of "C Corp", which traded during the regular trading session for $2.00 per share, were traded for $3.00 per share during extended-hours trading, the most current value for one share of "C Corp" is $3.00. Assuming that security "C" is the only security in security index 64 that traded during the extended-hours trading, discrete security trade value summing process 70 will sum the $3 per share value of "C Corp" and the $3 per share value of "D Corp" to generate a current index stock weighted value 68 of $6 for security index 64.

Current index stock weighted value 68 and a closing index stock weighted value 62 are provided to a stock weighting comparison process 72. Stock weighting comparison process 72 compares these values 62 and 68 so that the predicted opening index price 44, can be calculated for the respective security index. As above, this comparison can be handled in one of several ways. For example, in this particular example, the current index stock weighted value 68 is equivalent to the predicted opening index price for that particular security index, as current index stock weighted value 68 takes into account the current value of each security within security index 64. Alternatively, a ratio (i.e., a multiplier) can be determined that will allow for calculation of the predicted opening price for that particular index. In the particular example, as the current index stock weighted value 68 is $6 and the closing index stock weighted value 62 is $5, the ratio would be 6/5 or 1.20. Therefore, this is indicative that the opening index price $42_{1-n}$ for that particular security index will be approximately 20% greater than its closing price.

Administrator 34 may scale the value of a security index so that it only reflects an administrator-defined portion of the stock weighted value for that security index. For example, continuing on the above-started example, as security "C" trades for $3 per share and security "D" trades for $3 per share, this security index 64 would close at a value of $6, which might be considered too low a value for an index. Therefore, administrator 34 may chose to define the value of this security index to be ten times its actual value. Accordingly, the value of this index would be $60, which may be considered a more desirable number. As above, this scaling can occur in the current index stock weighting process 66 and closing index stock weighting process 60, so that values 62 and 68 are pre-scaled before being provided to the stock weighting comparison process 72. Alternatively, this scaling can occur in the stock weighting comparison process 72 itself. Additionally, as above, administrator 34 may chose to bolster or limit the influence that certain securities have on a security index. For example, continuing with the above-stated example, security "C" trades for $3 per share and security "D" trades for $3 per share. If a third security, namely security "R", was added which traded for $200 per share, it is easy to see that even a drastic movement in the trade value of either or both securities "C" and "D" would have essentially no impact on the value of security index 64. This is due to the fact that security "R" accounts for 97.08% of the sum of the total share values for that security index. Therefore, administrator 34 may choose to limit the impact that a specific security can have on the value of a security index. This is often accomplished by limiting the amount that a discrete security's trade value can be in relation to the security index's stock weighted value. As above, this limit can be expressed as either a percentage of the index's stock weighted value or a finite dollar share value limit. This method of index rebalancing is the subject of U.S. Pat. No. 6,061,663, entitled "Index. Rebalancing", which issued on May 9, 2000, and is herein considered incorporated by reference.

As the accuracy of the predicted opening index prices $42_{1-n}$ generated by market indicator process 10 is directly dependant on the accuracy of the trade values for securities traded during extended-hours, it is important that these trade values be accurately reported and filtered to remove any bad trades. Trade monitoring process 36 includes a trade filtering process 74 for filtering out bad trades that occur during this extended-hours trading session. This method of filtering is the subject of U.S. patent application Ser. No. 09/841,661, entitled "Extended Hours Trade Filtering", which was filed on Apr. 24, 2001, and is herein considered incorporated by reference.

Figure 2:
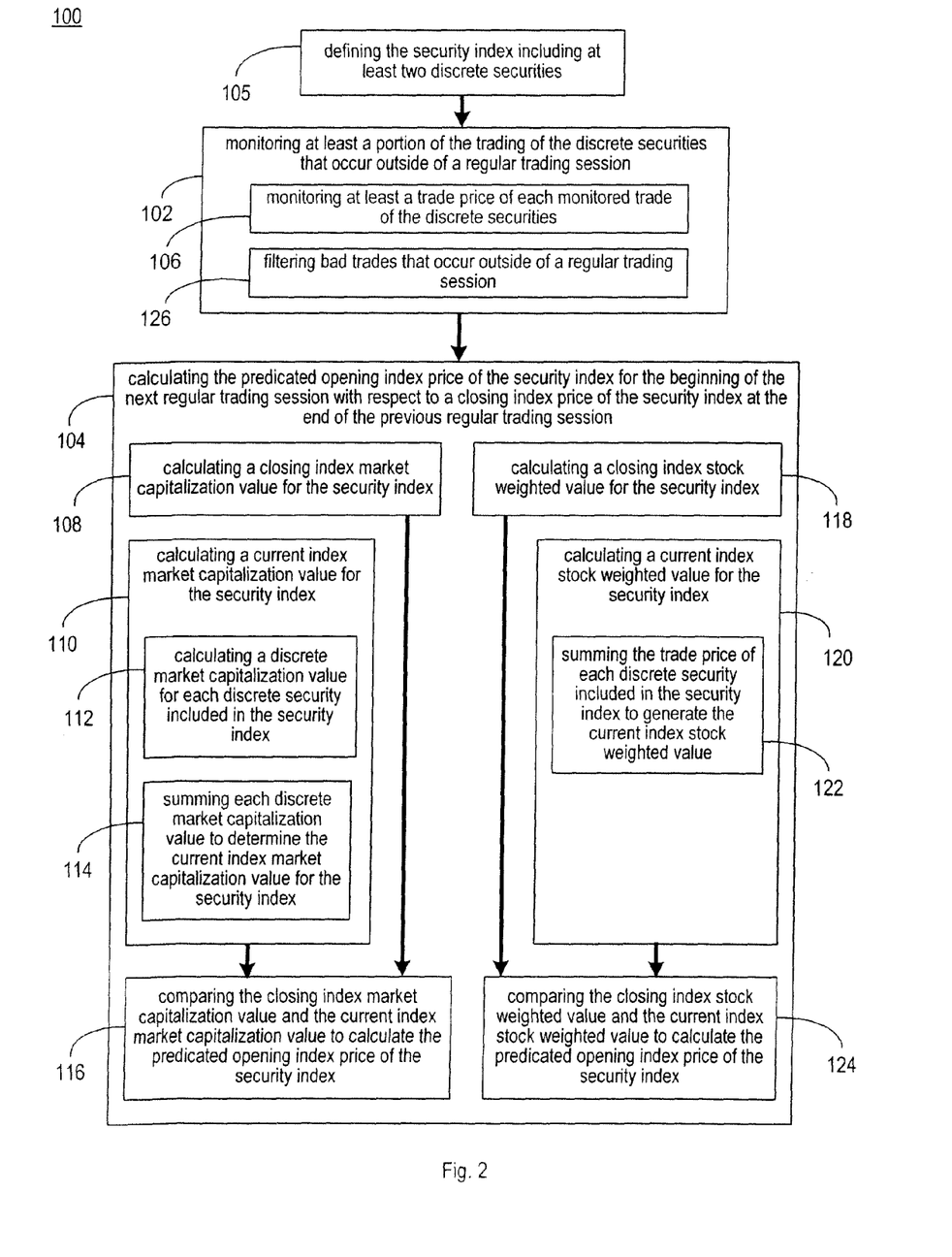
FIG. 2 is a diagrammatic view of a market indicator method.

Referring to FIG. 2, there is shown a market indicator method 100 for predicting an opening index price of a security index including at least two discrete securities. Method 100 monitors 102 at least a portion of the trading of the discrete securities that occur outside of a regular trading session and calculates 104 the predicated opening index price of the security index for the beginning of the next regular trading session with respect to a closing index price of the security index at the end of the previous regular trading session. These index prices are indicative of the cumulative value of the discrete securities.

Method 100 defines 105 the security index including at least two discrete securities. Monitoring 102 at least a portion of the trading includes monitoring 106 at least a trade price of each monitored trade of the discrete securities.

The security index is a market capitalization weighted index. Calculating 104 the predicated opening index price includes calculating 108 a closing index market capitalization value for the security index. The closing index market capitalization value is the market capitalization value of the security index at the end of the previous regular trading session. Calculating 104 the predicated opening index price includes calculating 110 a current index market capitalization value for the security index. The current index market capitalization value is the current market capitalization value of the security index. Calculating 110 a current index market capitalization value includes calculating 112 a discrete market capitalization value for each discrete security included in the security index. Each discrete market capitalization value is the product of the total number of outstanding shares of that discrete security and the trade price of that discrete security. The trade price represents the last trade value that that discrete security traded for. Calculating 110 a current index market capitalization value includes summing 114 each discrete market capitalization value to determine the current index market capitalization value for the security index. Calculating 104 the predicated opening index price includes comparing 116 the closing index market capitalization value and the current index market capitalization value to calculate the predicated opening index price of the security index.

The security index is a stock weighted index. Calculating 104 the predicated opening index price includes calculating 118 a closing index stock weighted value for the security index. The closing index stock weighted value is the stock weighted value of the security index at the end of the previous regular trading session. Calculating 104 the predicated opening index price includes calculating 120 a current index stock weighted value for the security index. The current index stock weighted value is the current stock weighted value of the security index. Calculating 120 a current index stock weighted value includes summing 122 the trade price of each discrete security included in the security index to generate the current index stock weighted value. The trade price represents the last trade value that that discrete security traded for. Calculating 104 the predicated opening index price includes comparing 124 the closing index stock weighted value and the current index stock weighted value to calculate the predicated opening index price of the security index.

Monitoring 102 at least a portion of the trading includes filtering 126 bad trades that occur outside of a regular trading session.

Figure 3:
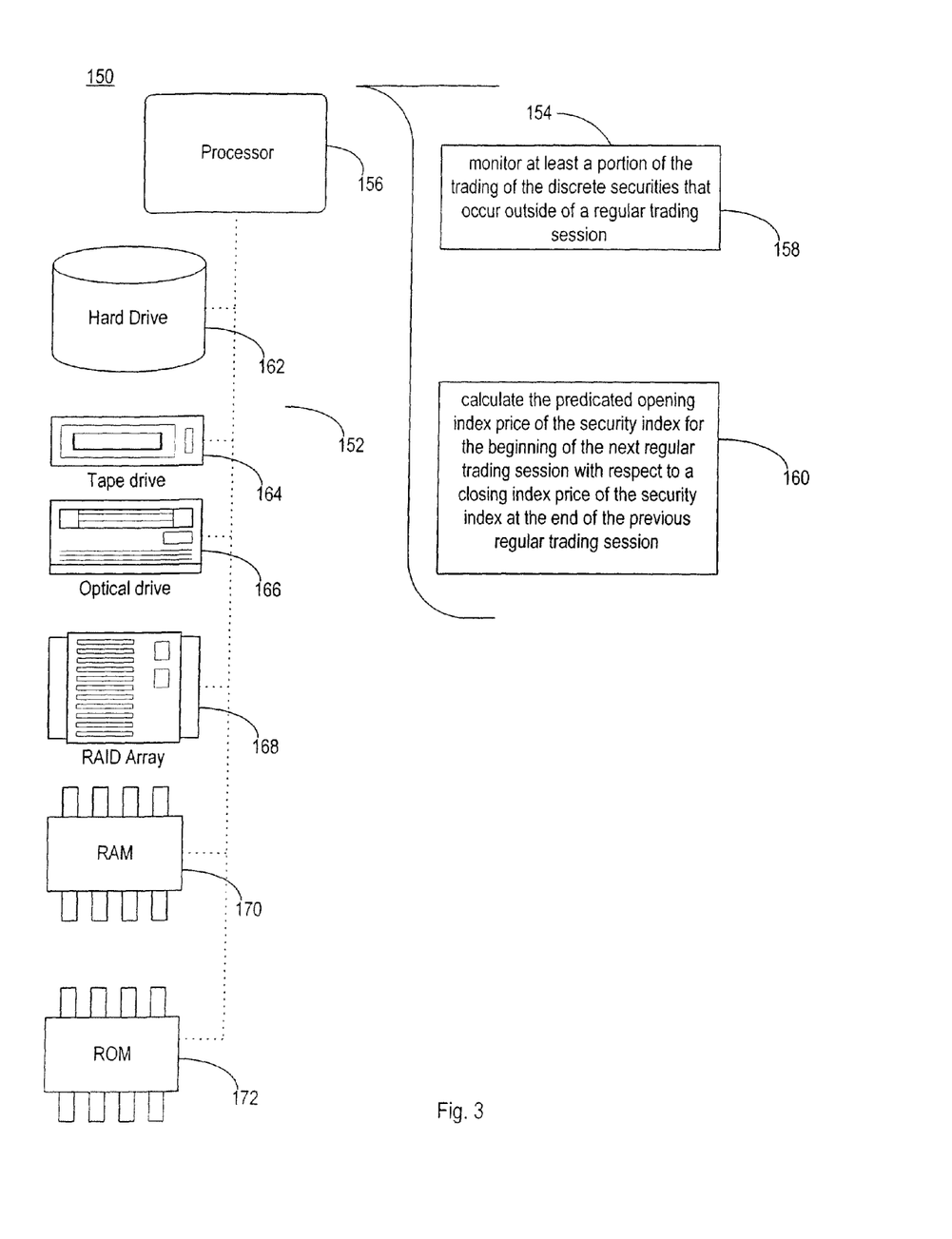
FIG. 3 is a diagrammatic view of another embodiment of the market indicator process.

Referring to FIG. 3, there is shown a computer program product 150 residing on a computer readable medium 152 having a plurality of instructions 154 stored thereon. When executed by processor 156, instructions 154 cause processor 156 to monitor 158 at least a portion of the trading of the discrete securities that occur outside of a regular trading session. Computer program product 150 calculates 160 the predicated opening index price of the security index for the beginning of the next regular trading session with respect to a closing index price of the security index at the end of the previous regular trading session. The index prices are indicative of the cumulative value of the discrete securities.

Typical embodiments of computer readable medium 152 are: hard drive 162; tape drive 164; optical drive 166; RAID array 168; random access memory 170; and read only memory 172.

Figure 4:
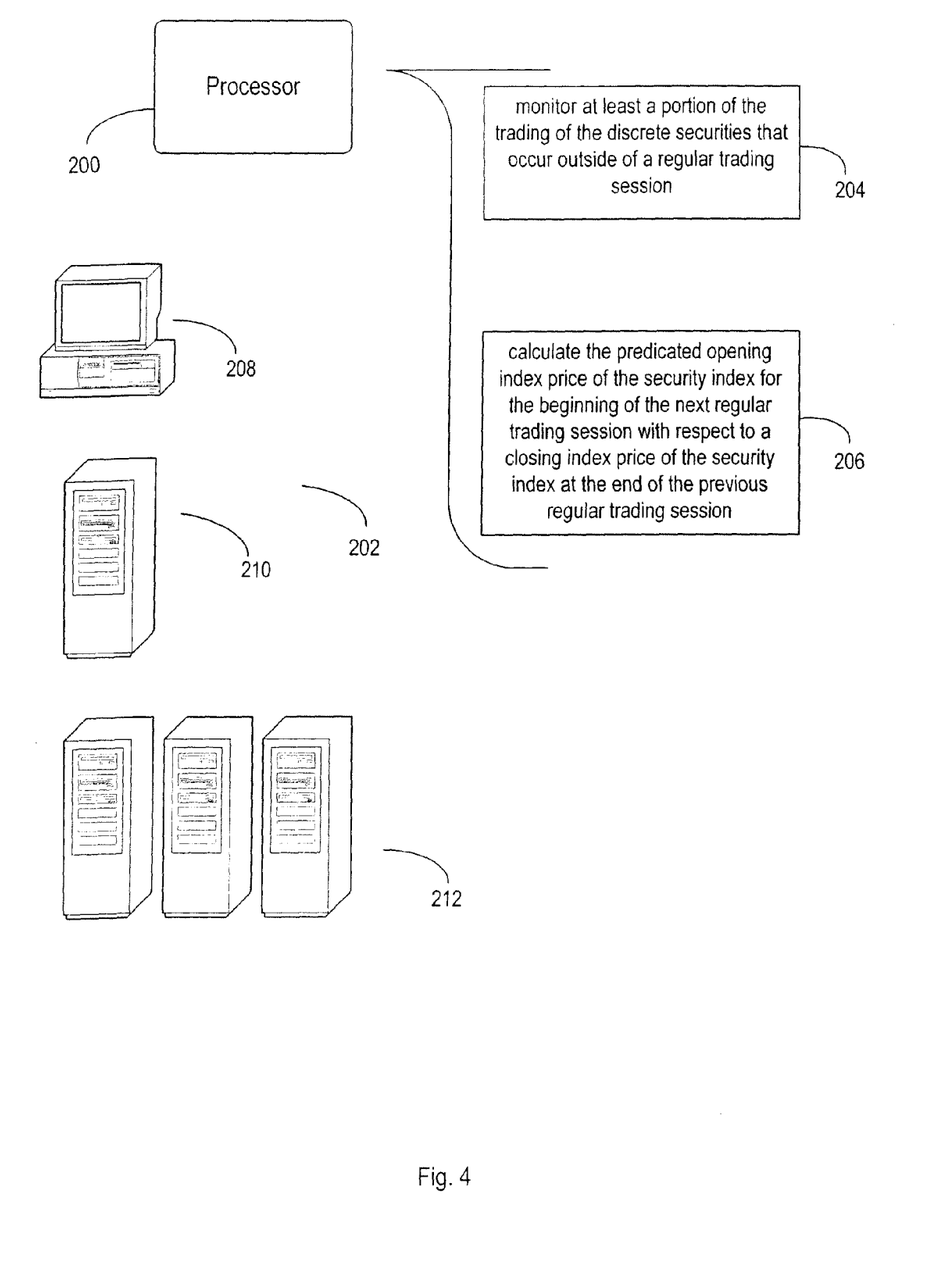
FIG. 4 is a diagrammatic view of another embodiment of the market indicator process.

Now referring to FIG. 4, there is shown a processor 200 and memory 202 configured to monitor 204 at least a portion of the trading of the discrete securities that occur outside of a regular trading session. Processor 200 and memory 202 calculate 206 the predicated opening index price of the security index for the beginning of the next regular trading session with respect to a closing index price of the security index at the end of the previous regular trading session. The index prices are indicative of the cumulative value of the discrete securities.

Processor 200 and memory 202 may be incorporated into a personal computer 208, a network server 210, or a single board computer 212.

A number of embodiments of the invention have been described. Nevertheless, it will be understood that various modifications may be made without departing from the spirit and scope of the invention. Accordingly, other embodiments are within the scope of the following claims.

What is claimed is:

1. A process, executing on a computer, for predicting an opening index price of a stock weighted security index that includes at least two discrete securities, an index price being indicative of a cumulative value of prices of each of the discrete securities, the process comprising:
   monitoring by one or more computer systems at least a portion of trading of the discrete securities that occurs outside of a regular trading session for trading of the discrete securities; and
   calculating by the one or more computers a predicted opening index price of the stock weighted security index for the beginning of trading in the stock weighted security index for a next regular trading session in the discrete securities with respect to a closing index price of said stock weighted security index at the end of the regular trading session in the discrete securities, with the predicted opening and closing index prices being indicative of the cumulative value of the prices of the discrete securities.

2. The process of claim 1 further comprising:
   defining said security index including at least two discrete securities with calculating based at least in part on the monitored trading of the discrete securities that occurred outside of the regular trading session.

3. The process of claim 1 wherein one or more computer are configured to monitor at least a trade price of each monitored trade of said discrete securities.

4. The process of claim 3 wherein said stock weighted index has a value determined by a sum of the value of one share of each security included in the stock weighted index.

5. The process of claim 4 further comprising:
   calculating by the one or more computers a closing index stock weighted value for the security index the closing index stock weighted value corresponding to the stock weighted value of said security index at the end of the previous regular trading session.

6. The process of claim 5 further comprising:
   calculating by the one or more computers a current index stock weighted value for the security index the current index stock weighted value corresponding to the current stock weighted value of said security index.

7. The process of claim 6 further comprising:
   summing the trade price that represents the last trade value of each discrete security included in the security index to generate the current index stock weighted value.

8. The process of claim 6 further comprising:
   comparing the closing index stock weighted value and the current index stock weighted value to calculate said predicted opening index price of said security index.

9. The process of claim 1 further comprising:
   filtering by the one or more computers bad trades that occur outside of a regular trading session.

10. Apparatus for predicting an opening index price of a stock weighted security index, the apparatus comprising:
    one or more computer systems comprising a processor and memory, the one or more computer systems configured to:
    receive a definition of a security index including at least two discrete securities with an index price indicative of a cumulative value of prices of each of the discrete securities;
    monitor at least a portion of trading of the discrete securities that occurs outside of a regular trading session for the discrete securities; and
    calculate a predicted opening index price of said stock weighted security index for the beginning of trading in the stock weighted security index for a next regular trading session in the discrete securities with respect to a closing index price of said stock weighted security index at the end of the regular trading session based at least in part on the monitored trading of the discrete securities that occurred outside of the regular trading session, with the predicted opening and closing index prices being indicative of the cumulative value of the prices of the discrete securities.

11. Apparatus for predicting an opening index price of a stock weighted index security index including at least two discrete securities with the index price indicative of a cumulative value of prices of each of the discrete securities, the apparatus comprising:

one or more computer systems comprising a processor and memory, the one or more computer systems configured to monitor at least a portion of the trading of the discrete securities that occurs outside of a regular trading session for the discrete securities; and calculate the predicted opening index price of the stock weighted security index for the beginning of trading in the stock weighted security index for a next regular trading session in the discrete securities with respect to a closing index price of said stock weighted security index at the end of the regular trading session, based at least in part on the monitored trading of the discrete securities that occurred outside of the regular trading session, with the predicted opening and closing index prices being indicative of the cumulative value of the prices of the discrete securities.

12. The apparatus of claim 11 further including the one or more computers configured to receive a definition of the security index including at least two discrete securities.

13. The apparatus of claim 11 wherein the one or more computers are configured to monitor at least a trade price of each monitored trade of the discrete securities.

14. The apparatus of claim 13 wherein the security index is a stock weighted index and the one or more computers are configured to calculate a closing index stock weighted value for the security index, the closing index stock weighted value corresponding to the stock weighted value of the security index at the end of the regular trading session.

15. The apparatus of claim 14 wherein the one or more computers are configured to calculate a current index stock weighted value for the security index, with the current index stock weighted value corresponding to the current stock weighted value of the security index.

16. The apparatus of claim 15 wherein the one or more computers are configured to sum the last trade price of each discrete security included in the security index to generate the current index stock weighted value.

17. The apparatus of claim 15 wherein the one or more computers are configured to compare the closing index stock weighted value and the current index stock weighted value to calculate the predicted opening index price of the security index.

18. The apparatus of claim 11 wherein the one or more computers are configured to filter bad trades that occur outside of the regular trading session.

19. A computer program product residing on a computer readable medium having a plurality of instructions stored thereon which, when executed by the processor, cause that processor to:

receive a definition of a stock weighted index including at least two discrete securities with an index price indicative of a cumulative value of prices of each of the discrete securities;

monitor at least a portion of trading of the discrete securities that occurs outside of a regular trading session for the discrete securities; and calculate a predicted opening index price of the stock weighted index for the beginning of the next regular trading session with respect to a closing index price of the stock weighted index at the end of the previous regular trading session, based at least in part on the monitored trading of the discrete securities that occurred outside of the regular trading session, with the predicted opening and closing index prices being indicative of the cumulative value of the prices of the discrete securities.

20. The computer program product of claim 19 further including instructions to receive a definition of the security index including at least two discrete securities.

21. The computer program product of claim 19 further including instructions to monitor at least a trade price of each monitored trade of the discrete securities.

22. The computer program product of claim 19 wherein the security index is a stock weighted index and further includes instructions to calculate a closing index stock weighted value for the security index, the closing index stock weighted value corresponding to the stock weighted value of the security index at the end of the regular trading session.

23. The computer program product of claim 19 further comprising instructions to:

calculate a current index stock weighted value for the security index, with the current index stock weighted value corresponding to the current stock weighted value of the security index.

24. The computer program product of claim 19 further comprising instructions to:

sum the last trade price of each discrete security included in the security index to generate the current index stock weighted value.

25. The computer program product of claim 19 further comprising instructions to:

compare the closing index stock weighted value and the current index stock weighted value to calculate the predicted opening index price of the security index.

26. The computer program product of claim 19 further comprising instructions to filter bad trades that occur outside of the regular trading session.

* * * * *